United States Patent [19]

Millet et al.

[11] Patent Number: 4,705,810

[45] Date of Patent: Nov. 10, 1987

[54] BLOWING AGENT ADMIXTURE FOR FOAMABLE ORGANOPOLYSILOXANE COMPOSITIONS

[75] Inventors: Claude Millet, Saint-Priest; Paul Rostaing, Vienne, both of France

[73] Assignee: Rhone-Poulenc Chimie, Courbevoie, France

[21] Appl. No.: 4,479

[22] Filed: Jan. 20, 1987

[30] Foreign Application Priority Data

Jan. 21, 1986 [FR] France ................... 86 00977

[51] Int. Cl.⁴ .............................................. C08J 9/08
[52] U.S. Cl. ........................................ 521/86; 521/92; 521/97; 521/110; 521/125; 521/130; 521/154

[58] Field of Search ............... 521/92, 97, 125, 130, 521/154, 86, 110

[56] References Cited

U.S. PATENT DOCUMENTS 4,230,820 10/1980 Maschberger et al. ............. 521/154
4,490,488 12/1984 Cush .................................. 521/154
4,567,212 1/1986 Baurman et al. ................... 521/154

Primary Examiner—Morton Foelak
Attorney, Agent, or Firm—Burns, Doane, Swecker & Mathis

[57] ABSTRACT

Novel blowing agents for foamable organopolysiloxane compositions, notably the platinum-catalyzed such organopolysiloxane compositions, comprise admixture of calcium carbonate and an organic carboxylic acid.

9 Claims, No Drawings

BLOWING AGENT ADMIXTURE FOR FOAMABLE ORGANOPOLYSILOXANE COMPOSITIONS

BACKGROUND OF THE INVENTION

1. Field of the Invention

The present invention relates to novel blowing agents for platinum-catalyzed organopolysiloxane compositions of the SiH/vinyl-Si type, which may be converted into silicone foams at ambient or higher temperatures, and which foams are useful, e.g., for insulation purposes.

2. Description of the Prior Art

Presently, the silicone foams are typically prepared according to one of the following three methods:

(1) a blowing agent is added, that is to say, an additive which produces a gas, frequently nitrogen, when heated: a method of this type is described particularly in U.S. Pat. Nos. 3,425,967, 3,429,838, 3,677,981 and 4,189,545. Blowing agents of this kind are, for example: azobis(isobutyronitrile), dinitropentamethylenetetramine, terephthalazide, azodicarbonamide, and water, (2) a gas is incorporated into the organopolysiloxane composition at atmospheric pressure when the components of the composition are being mixed, the mixture gelled under vacuum, and then the silicone is cross-linked (U.S. Pat. No. 4,368,279), (3) a gas, usually hydrogen, is generated, in situ, when the composition is being mixed. The release of hydrogen is produced by the reaction of an organohydrosiloxane with a hydroxyl group. The compositions then generally contain silanol and/or alcohol groups. Compositions of this type are described particularly in U.S. Pat. Nos. 3,070,555, 3,338,847 and 3,923,705. However, the presence of hydroxyl groups (silanol, alcohol) is not necessary, it being possible for such groups to be formed, in situ, by the reaction of water with organohydrosilanes (U.S. Pat. No. 3,516,951).

The first method has the disadvantage of requiring heating, generally to a fairly high temperature (typically above 180° C.) in order to produce satisfactory results.

The second method requires apparatus for the application of vacuum and, consequently, its use on an industrial scale is restricted to the manufacture of articles of limited size and using a multistage process.

The third method, which is the most widely used, produces hydrogen, which is somewhat hazardous when placed in ovens to effect crosslinking.

SUMMARY OF THE INVENTION

Accordingly, a major object of the present invention is the provision of improved blowing agents for platinum-catalyzed organopolysiloxane compositions of the SiH/vinyl-Si type which are devoid of the disadvantages and drawbacks to date characterizing the state of the art, or at very least markedly diminish same.

Another object of the present invention is to provide inexpensive blowing agents which can readily be incorporated in silicone compositions, which are effective, stable in storage, provide the compositions with adequate "pot life" prior to use, and which can be adapted to form gases beginning at ambient temperature or upon being heated.

Unless otherwise indicated, all percentages and parts given herein are on a weight basis.

Briefly, the present invention features a foamable organopolysiloxane composition, comprising:

(A) 100 parts of at least one diorganopolysiloxane oil blocked at each end of its polymer chain by a vinyldiorganosiloxy unit in which the organic radicals bonded to the silicon atoms are selected from among methyl, ethyl, n-propyl, vinyl, phenyl and 3,3,3-trifluoropropyl radicals, having a viscosity of 100 to 300,000 mPa.s at 25° C., (B) at least one organohydropolysiloxane selected from among oily and liquid resinous homopolymers and copolymers, containing at least three SiH groups per molecule and a single hydrogen atom bonded to the same silicon atom, the organic radicals bonded to the silicon atoms being selected from among methyl, ethyl, n-propyl, phenyl and 3,3,3-trifluoropropyl radicals, said materials (B) being present in such amount that the molar ratio SiH/vinyl-Si ranges from 0.8 to 8, preferably from 1.1 to 4, (C) a catalytically effective amount of a platinum curing catalyst, (D) 0 to 200 parts of a inorganic and/or metallic filler, preferably 30 to 80 parts, and (E) an amount of a blowing additive which is effective in forming cells and which comprises a mixture of calcium carbonate and at least one organic carboxylic acid.

DETAILED DESCRIPTION OF THE PREFERRED EMBODIMENTS OF THE INVENTION

More particularly according to the present invention, respecting the component (E), from 1 to 70 parts, preferably from 5 to 30 parts, of carboxylic acid are advantageously used per 100 parts of calcium carbonate. The calcium carbonate used in the present invention is a ground natural carbonate, or an optionally treated precipitated carbonate, typically employed as a filler in silicone elastomers. Its particle size preferably ranges from 0.05 to 10 micrometers. The organic carboxylic acids which are preferred are mono- or polycarboxylic acids containing a linear or branched $C_1$-$C_{25}$ hydrocarbon chain, which is saturated or which contains alkenyl or alkynyl unsaturation. Among such acids, preferred are: formic, acetic, propionic, butyric, isobutyric, valeric, isovaleric, pivalic, lauric, myristic, palmitic, stearic, oxalic, malonic, succinic, glutaric, adipic, pimelic, suberic, azelaic and sebacic acid; acrylic, propiolic (CH≡C—COOH), methacrylic, crotonic, isocrotonic, oleic and maleic acid; fumaric, citraconic and mesaconic acid. It is also possible to use carbocylic carboxylic acids containing at most 25 carbon atoms, such as camphoric, benzoic, phthalic, isophthalic, terephthalic, 2-naphoic, o-toluic, atropic and cinnamic acid.

It is likewise possible to use Versatic ® acids which are mixtures of saturated tertiary monocarboxylic acids containing, in all, the same number of carbon atoms, generally from 8 to 12. Also within the ambit of the present invention are the precursors of these acids which produce said acids when the composition is manufactured; for example, by being heated during crosslinking. In the case where the carboxylic acid employed already reacts with sodium carbonate at ambient temperature, a dispersion of the acid in a silicone oil which is unreactive towards said acid is produced beforehand, and this permits the reaction of the acid with the carbonate to be inhibited a ambient temperature. This silicone oil may be, for example, an oil (A) having a viscosity of from 10 to 4000 mPa.s at 25° C., and an unreactive oil having a viscosity of between 10 and 4000 mPa.s which is preferably a dimethylpolysiloxane oil blocked at each of its polymer chain ends by a trimethylsiloxy group, and which may also be a substantially linear diorganopolysiloxane polymer or copolymer in which the organic radicals are selected from among methyl, ethyl, phenyl and 3,3,3-trifluoropropyl radicals, at least 70 mol of these radicals being methyl radicals and at most 15 mol % being phenyl radicals. In the case where the carboxylic acid is liquid at ambient temperature, it is sufficient to mix the oil and the acid in a mixer fitted with any type of agitation system, and heating the silicone oil, if appropriate. In the case where the carboxylic acid is a solid, the silicone oil may be heated to a temperature above the melting point of the acid, or the acid may be dissolved in an organic solvent which is compatible with silicones. The calcium carbonate is then incorporated, the agitation being preferably continuous, in the dispersion, and this is preferably followed by grinding of the combined materials. A paste of the blowing additive in silicone oil, generally from 0.4 to 5 parts of oil per 1 part of blowing additive, is thus produced. 0.5 to 50 parts, preferably from 2 to 20 parts, of paste are generally employed per 100 parts of foamable silicone composition.

Without wishing to be bound by any particular scientific theory, the formation of a foam by the blowing agent could be explained as follows.

In the case of certain carboxylic acids, such as, for example, oleic and stearic acid, calcium carbonate does not react under cold conditions, but reacts when heated. With other carboxylic acids, such as, for example, acetic acid, calcium carbonate can react under cold conditions. In both cases, in accordance with the present invention, this reaction may be avoided by dispersing the calcium carbonate in a silicone oil as described above in all cases. This inhibition disappears on heating, after mixing of the components of the organopolysiloxane composition, at a temperature above 100° C., preferably above 140° C., and the reaction of the carbonate with the acid produces, in particular, carbon dioxide, which takes part in the formation of the cells and water. This water, in turn, reacts with the SiH groups of the polyorganosiloxane (B) with a release of hydrogen and formation of silanols, the latter reacting with the SiH groups to provide siloxane concatenations and a release of hydrogen. This release of hydrogen takes part in the formation of the cells, but it is less hazardous than that produced in method (3) of the prior art, referred to above, because it is highly diluted by the carbon dioxide (which is inert towards hydrogen). The blowing agent according to the invention appears, therefore, as a novel combination of methods (1) and (3) of the prior art, and results in the formation of cells of substantially identical size which is controllable and can be very fine (0.1 mm and less) or relatively large (0.5 mm and more).

In addition to the carbonate, another inorganic and/or organic filler may be employed. This may be selected from among:

(i) reinforcing fillers, such as pyrogenic or precipitated silica, (ii) semi-reinforcing or non-reinforcing fillers, such as ground quartz, diatomaceous silica, talc, mica, calcium carbonate, calcined clay, magnesium, titanium, iron, zinc, aluminum, lead and copper oxides, rare earth oxides and hydroxides (such as ceric oxide or ceric hydroxide), zinc silicate, barium sulfate, barium or zinc metaphosphate, lead borate, lead carbonate, zinc borate, calcium borate, barium borate and aluminum silicate, or (iii) metal powders, such as those based on copper, iron, lead, aluminum or zinc.

Other fillers may be employed, such as carbon black in a proportion of 0.02 to 1 part, preferably 0.15 to 0.9 part, per 100 parts of the vinylated oil (A). The presence of a carbon black which is free from sulfur or of sulfur derivatives makes it possible, in some formulations, to produce a fairly marked improvement in the burning resistance of the foams. In some cases, the burning resistance can be further reinforced by combining carbon black with ceric hydroxide, this hydroxide being then introduced in a proportion of 0.005 parts to 4 parts, preferably 0.01 to 3.5 parts, per 100 parts of the vinylated oil (A).

The platinum catalyst (C) is typically introduced such as to provide from 1 to 500 ppm (part per million), preferably from 5 to 80 ppm of platinum, expressed as metal, based on the vinylated oil (A).

This catalyst may be deposited on inert supports, such as silica gel, alumina or carbon black. Preferably, an unsupported catalyst is used which is selected from among chloroplatinic acid, its hexahydrate form, its alkali metal salts and its complexes with organic derivatives.

In particular, those recommended are the reaction products of chloroplatinic acid with vinylpolysiloxanes such as 1,3-divinyltetramethyldisiloxane, which are treated or otherwise with an alkaline agent to remove the chlorine atoms, partially or completely (U.S. Pat. Nos. 3,419,593, 3,775,452 and 3,814,730). Also recommended are the reaction products of chloroplatinic acid with alcohols, ethers and aldehydes (U.S. Pat. No. 3,220,972).

Other effective catalysts include platinum chelates and complexes of platinous chloride with phosphines, phosphine oxides, and with olefins such as ethylene, propylene and styrene (U.S. Pat. Nos. 3,159,610 and 3,552,327).

The diorganopolysiloxane oil (A), having a viscosity of 100 to 300,000 mPa. at 25° C., preferably 600 to 200,000 mPa.s at 25° C., is a linear polymer of a sequence of diorganosiloxy units blocked at the end of the polymer chain by a vinyldiorganosiloxy unit. The organic radicals bonded to the silicon atoms of the polymer are selected from among methyl, ethyl, n-propyl, vinyl, phenyl and 3,3,3-trifluoropropyl radicals; at least 60 mol % of these radicals are methyl radicals, at most 20 mol % are phenyl radicals and at most 2 mol % are vinyl radicals (this percentage does not include the vinyl radicals situated at the end of the chain).

As specific examples of diorganosiloxy units, representative are those of the formulae: $(CH_3)_2SiO$, $CH_3(CH_2=CH)SiO$, $CH_3(C_6H_5)SiO$, $(C_6H_5)_2SiO$, $CH_3(n-C_3H_7)SiO$, $CH_3(C_6H_5)SiO$, $CF_3CH_2CH_2(CH_3)SiO$.

A dimethylpolysiloxane oil blocked at each end of its polymer chain by a dimethylvinylsiloxy unit or a methylphenylvinylsiloxy unit, having a viscosity of 600 to 150,000 mPa.s at 25° C., is preferred.

Such oil is commercially available from the silicone manufacturers, and, furthermore, its production may be carried out, for example, by polycondensing and rearranging, in the presence of a catalyst, the hydrolysis product of a mixture of a diorganovinylchlorosilane and a diorganodichlorosilane. It may also be accomplished by the polymerization of a diorganocyclopolysiloxane such as octamethylcyclotetrasiloxane, with the aid of an alkaline or acidic catalyst in the presence of an appropriate amount of a chain-blocker such as that of the formula: $R(CH_2=CH)CH_3SiO[Si(CH_3)_2O]_n\text{-}SiCH_3(CH=CH_2)R$, with R being a methyl or phenyl radical and being any number from 0 to 20.

After the polymerization reaction has reached equilibrium, the catalyst is neutralized and the volatile compounds are removed by distillation. The oil (A) may be used by itself or in the form of a mixture of oils (A) which differ from each other in their viscosity value. Insofar as the foaming compositions are packaged as two components, it is also possible to introduce an oil of relatively low viscosity, for example 1,000 to 20,000 mPa.s at 25° C. in one of the two components and another oil, of higher viscosity, for example, from 60,000 to 150,000 mPa.s at 25° C. in the other component. This procedure permits the viscosity of the two components to be adjusted.

Up to 50% by weight of polymer (A) may be replaced by a resinous material which is an organopolysiloxane copolymer selected from among those consisting substantially of trimethylsiloxane, methylvinylsiloxane and $SiO_2$ units, in which 2.5 to 10 mol % of the silicon atoms bear a vinyl group, and in which the molar ratio of the trimethylsiloxane groups to the $SiO_2$ groups ranges from 0.5 to 1.

Such resinous copolymers which may be employed within the scope of the present invention are described in U.S. Pat. Nos. 3,284,406 and 3,436,366, hereby incorporated by reference.

The organohydrosiloxane (B) corresponding to the definition given above may be a homopolymer, a copolymer or mixtures thereof containing polysiloxane units of the formulae: $RSiO_{1.5}$, $R_2SiO$, $R_3SiO_{0.5}$, $SiO_2$, RHSiO, $HSiO_{1.5}$, and $RHSiO_{0.5}$, in which the organic radical R is as defined under (B) above. Thus, the material (B) may be a liquid organohydropolysiloxane polymer containing at least 3 SiH groups per mole and used in a proportion of 10 to 50 parts, preferably 15 to 35 parts, per 100 parts of the vinylated oil (A). This polymer corresponds to the average formula $R_xH_ySiO_{4-x-y/2}$, in which x is a number from 1 to 1.99, preferably 1.05 to 1.95 and y is a number from 0.1 to 1, preferably from 0.2 to 0.95, the sum $x+y$ represents a number from 1.7 to 2.6, preferably 1.75 to 2.55 and R represents a methyl, ethyl, n-propyl or phenyl radical, and at least 80% of the radicals R are methyl radicals. The above formula includes the polymers (B) which have a linear, cyclic or branched structure.

A polymer (B) of linear structure may correspond to the average formula: $R_{3-t}HtSi[OSiR_2]_g[OSiRH]_hOSiH_tR_{(3-t)}$ in which:
  t is the number zero or one,
  g is a number from 0 to 50,
  h is a number from 3 to 90, and
  R is as defined above under the description of the general formula.

A polymer is preferably used having a linear structure which corresponds to the average formula: $(CH_3)_3Si[OSi(CH_3)_2]_g[OSi(CH_3)H]_hOSi(CH_3)_3$ in which g and h are as above defined.

A polymer (B) of cyclic structure may correspond to the average formula: $[OSiRH]_{n1}[OSiG_2]_{n2}$, in which
  n1 is a number from 3 to 10,
  n2 is a number from zero to 5, and
  G is as defined above.

A polymer of cyclic structure corresponding to the formula $[OSi(CH_3)H]_4$ or to the formula $[OSi(CH_3)H]_3$ is preferably obtained.

A polymer (B) of branched structure contains at least one unit of the formulae $RSiO_{1.5}$, $SiO_2$ and $HSiO_{1.5}$, the remaining units being selected from among those of formulae: $R_3SiO_{0.5}$, $HR_2SiO_{0.5}$, $R_2SiO$ and $H(R)SiO$ with R again being as defined above.

A polymer which has a well-determined branched structure may correspond to the average formula: $R'_wSi[OSiR_2H]_{w'}[(OSiR_3)_{w''}]_{4-w}$, in which:
  R' is R or H (R is as defined above);
  w is the number zero or one;
  w' is the number 2, 3 or 4;
  w" is the number zero or one;
  $w'+w''$ is the number 3 or 4; however,
    when w is zero, w' is the number 3 or 4;
    when w is 1 and R' is H, w' is the number 2 or 3;
    when w is 1 and R' is R, w' is the number 3.

A polymer of branched structure corresponding to the formula: $CH_3Si[OSi(CH_3)_2H]_3$ or to the formula $Si[OSi(CH_3)_2H]_4$ is preferably selected.

Other examples of organohydropolysiloxanes which may be used in the compositions of the present invention are also described in U.S. Pat. Nos. 3,284,406 and 3,436,366, hereby incorporated by reference.

The formulation of the foaming compositions in accordance with the invention may be carried out by merely mixing the various constituents (A), (B), (C), (D) and (E) in any order of addition, using appropriate apparatus.

It is desirable, however, to add the platinum catalyst (C) or the organohydropolysiloxane (B) last. The compositions formed in this manner may be immediately converted into foams beginning at ambient temperature or upon being heated to a temperature from ambient temperature to 200° C. for a period of time of from 2 to 30 min. The foam formation temperature depends principally on the nature of the organic carboxylic acid employed. Thus, in the case of stearic acid, heating to 170°–180° C. for approximately 10–20 min is required.

The compositions of the invention may be formulated, as indicated earlier, by merely mixing the various constituents. Some of these compositions are immediately converted into foam at ambient temperature. In this case, to stabilize them and to package them in the form of single-component compositions which have "a pot life" longer than one day, an inhibitor must be added to the platinum catalyst (C). Inhibitors of this type are well known; particularly exemplary are amines, silazanes, oximes, diesters of dicarboxylic acids, acetylenic alcohols, acetylenic ketones and vinylmethylcyclopolysiloxanes (U.S. Pat. Nos. 3,445,420 and 3,989,667).

The inhibitor is used in a proportion of 0.005 to 5 parts, preferably 0.01 to 3 parts, per 100 parts of the vinylated oil (A).

The compositions which contain an inhibitor may be stable for several days at ambient temperature. To produce the foams at the required time, the compositions must be heated above 60° C., preferably above 100° C.; however, this operating procedure is also a constraint, and thus, in the majority of cases, the compositions according to the invention are packaged as two- or three-components (the inhibitor is eliminated or is added in a small proportion, the goal being to regulate the time of formation of the foams).

One of the components may, for example, be a proportion of the vinylated oils (A), a proportion of the fillers (D), all the catalyst (C) and the blowing agent (E), it being possible for the latter to form the subject of a separate component, in the form of a paste, as indicated earlier.

The other component may be the remaining proportion of the vinylated oils (A), the remaining proportion of the fillers (D), and all of the organohydropolysiloxane (B).

By modifying the amounts of the various constituents used and the viscosity of the polymers, arrangements are made such as to prepare two components whose viscosities are not excessive, for example, not exceeding 20,000 mPa.s at 25° C.

As a function of the amounts employed and the number and the nature of the constituents forming part of each of the two or three components, it is possible to derive at a large number of compositions for packaging as two or three components. It is recommended, however, to place all of the platinum catalyst (C) in one of the components, and all of the organohydropolysiloxane polymer (B) in the other.

The foams produced from the compositions according to the invention can be used in the greatest variety of fields of application, particularly in light of their good flame resistance.

In nuclear power plants, holes are arranged in walls and ceilings for passage of electrical cables; after the cables have been installed, there remains an empty space where the passages are located, and this has to be filled. The compositions of the invention are admirably suitable for this purpose.

They are also suitable for filling, inside buildings, empty spaces which are situated, for example, in cable ducts, piping ducts and false ceilings.

They too are suitable for plugging holes and fissures which appear in concrete and masonry structures in paved tracks. Lastly, they are suitable in fields of application employing flexible, lightweight, flame-resistant and aging-resistant materials, such as the protection of electronic components, the manufacture of buffers and, more especially, of passenger seat cushions in means of transport (motor vehicle, train, underground railway, and the like).

In order to further illustrate the present invention and the advantages thereof, the following specific examples are given, it being understood that same are intended only as illustrative and in nowise limitative.

EXAMPLE 1

Two components X and Y, which were mixed in a weight ratio of 1/1 at the time of use, and to which the blowing paste Z was then added, were used to produce foams. These two components were formed from the constituents selected from the following:

($A_1$) Vinylated dimethylpolysiloxane oil having a viscosity of 100,000 mPa.s at 25° C., blocked at each end of its polymer chain by a vinyldimethylsiloxy unit;

($A_2$) Dimethylpolysiloxane oil having a viscosity of 3,500 mPa.s at 25° C., blocked at each end of its polymer chain by a trimethylsiloxy unit;

($A_3$) Silicone resin in solution in xylene containing 40 mol % of $(CH_3)SiO_{0.5}$ units, 6 mol % of $(CH_3)(CH_2=CH)SiO$ units and 53.5 mol % of $SiO_2$;

($B_1$) Hydrogenated liquid silicone resin prepared by hydrolysis of technical-grade silicate $Si(OC_2H_5)_4$ and of $(CH_3)_2HSiCl$ in amounts corresponding to 1 mole of $SiO_2$ per 2 moles of $M_2HSiCl$ in solution in toluene. This resin thus had a theoretical molar ratio of $(CH_3)HSiO_{0.5}$ units to $SiO_2$ of 2 and an actual molar ratio of 2.23;

($C_1$) A catalyst solution containing 0.25% of platinum metal; this solution was prepared by stirring at ambient temperature, a mixture containing 0.6 part of chloroplatinic acid, 10 parts of isopropanol, 55 parts of xylene and 6 parts of 1,1,3,3-tetramethyl-1,3-divinyldisiloxane;

($D_1$) Ground quartz having a mean particle diameter of 5 micrometers and with a specific surface area of approximately 1.7 $m^2/g$;

(E) Blowing additive;

($E'$)$_1$ Precipitated calcium carbonate having a mean particle size of 0.2 micrometer;

($E'$)$_2$ Ground natural calcium carbonate (particle size from 3 to 10 micrometers);

($E'$)$_3$ Natural calcium carbonate previously treated with stearic acid to render it water-repellent (particle size from 3 to 10 micrometers);

($E''$)$_1$ Acetic acid;

($E''$)$_2$ Stearic acid;

($E''$)$_3$ Oleic acid;

($E''$)$_4$ Adipic acid;

($E''$)$_5$ Versatic ® 10 acid, a synthetic acid consisting of a mixture of saturated tertiary carboxylic acids containing a total of 10 carbon atoms;

(F) Silicone oil for dispersing the acid ($E''$);

($F_1$) Identical to $A_2$;

($F_2$) Dimethylpolysiloxane oil blocked at each polymer end by a trimethylsiloxy unit and having a viscosity of 100 mPa.s at 25° C.

Insofar as the preparation of the foams and their physical characteristics are concerned, the following were noted:

(i) The blowing agent concentration in % based on the weight of the organopolysiloxane composition;

(ii) The concentrations in parts by weight of the three constituents ($E'$) ($E''$) and (F) of the paste containing the blowing agent;

(iii) The crosslinking time and temperature;

(iv) The density of the foams obtained, it being understood that the cell composition has a density of 1,250 $kg/m^3$;

(v) The "pot life" of the composition after mixing all constituents;

(vi) The appearance of the cells (of the pores) in the foam and/or the mean diameter of the cells (of the pores).

PREPARATION OF THE COMPOSITION (1) Preparation of component X:

The following materials were mixed in a pug mill:

$A_1$: 500 parts;

$A_3$ (calculated as the weight of solids): 150 parts;

$D_1$ (calculated as the weight of solids): 350 parts;

$C_1$: catalyst in a quantity of 40 ppm based on the weight of platinum.

(2) Preparation of component Y:

The following materials were mixed in a pug mill:

$A_1$: 480 parts;

$A_3$ (calculated as the weight of solids): 160 parts;

$D_1$: 315 parts;

B₁: 45parts.

(3) Preparation of component Z:
F₂: 400 parts;
(E″)₁ : 100 parts;
(E′)₁ : 500 parts.

(E″)₁ in powder form was dispersed in F₂, and then (E′)₁ was introduced into the dispersion with intensive stirring (50 revolutions/min) over 1 hour. The pasty product was then ground with the aid of a three-roll mill. 50 parts of X were mixed with 50 parts of Y and the component Z was added (in % by weight based on the weight of X+Z).

EXAMPLES 2 TO 9 AND COMPARATIVE EXAMPLES 10 AND 11

The compositions in these examples were prepared by following the operating procedure of Example 1. The nature and the concentration of the various constituents are reported in Table I below. Qualitative and quantitative assessments of the foams obtained are reported in Table II below. In comparative Examples 10 and 11, respectively, Porofor K (ADC) ®, marketed by Boehringer (Ingelheim) was used as the blowing agent.

These comparative examples showed that a foam was obtained, the cells of which were non-uniform, and, furthermore, had inadequate pot life.

appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A foamable organopolysiloxane composition of matter, comprising:
   (A) 100 parts of at least one diorganopolysiloxane oil blocked at each end of its polymer chain by a vinyldiorganosiloxy unit in which the organic radicals bonded to the silicon atom are selected from among methyl, ethyl, n-propyl, vinyl, phenyl and 3,3,3-trifluoropropyl radicals, having a viscosity of 100 to 300,000 mPa.s at 25° C.;
   (B) At least one organohydropolysiloxane selected from among oily and liquid resinous homopolymers and copolymers, containing at least three SiH groups per molecule and a single hydrogen atom bonded to the same silicon atom, the organic radicals bonded to the silicon atoms being selected from among methyl, ethyl, n-propyl, phenyl and 3,3,3-trifluoropropyl radicals, said siloxane (B) being present in such amount that the molar ratio SiH/vinyl-Si ranges from 0.8 to 8;

TABLE

| Constituents | | 1 | 2 | 3 | 4 | 5 | 6 | 7 | 8 | 9 | 10 | 11 |
|---|---|---|---|---|---|---|---|---|---|---|---|---|
| X | A₁ | 500 | 500 | 500 | 500 | 500 | 500 | 500 | 500 | 500 | 500 | 500 |
| | A₂ | — | — | — | — | — | — | — | — | — | — | — |
| | A₃ | 150 | 150 | 150 | 150 | 150 | 150 | 150 | 150 | 150 | 150 | 150 |
| | B₁ | — | — | — | — | — | — | — | — | — | — | — |
| | C₁* | 20 | 20 | 20 | 20 | 20 | 20 | 20 | 20 | 20 | 20 | 20 |
| | D₁ | 350 | 350 | 350 | 350 | 350 | 350 | 350 | 350 | 350 | 350 | 350 |
| Y | A₁ | 480 | 480 | 480 | 480 | 480 | 480 | 480 | 480 | 480 | 480 | 480 |
| | A₂ | — | — | — | — | — | — | — | — | — | — | — |
| | A₃ | 160 | 160 | 160 | 160 | 160 | 160 | 160 | 160 | 160 | 160 | 160 |
| | B₁ | 45 | 45 | 45 | 45 | 45 | 45 | 45 | 45 | 45 | 45 | 45 |
| | D₁ | 315 | 315 | 315 | 315 | 315 | 315 | 315 | 315 | 315 | 315 | 315 |
| Z | (E′)₁ | 500 | 500 | 500 | 340 | 340 | 340 | 340 | — | — | — | — |
| | (E′)₂ | — | — | — | — | — | — | — | 340 | — | — | — |
| | (E′)₃ | — | — | — | — | — | — | — | — | 340 | — | — |
| | E″₁ | 100 | — | — | — | — | — | — | — | — | — | — |
| | E″₂ | — | 100 | 100 | 120 | — | — | — | — | — | — | — |
| | E″₃ | — | — | — | — | 120 | — | — | 120 | 120 | — | — |
| | E″₄ | — | — | — | — | — | 120 | — | — | — | — | — |
| | E″₅ | — | — | — | — | — | — | 120 | — | — | — | — |
| | F₁ | — | — | — | 540 | 540 | 540 | 540 | 540 | 540 | — | — |
| | F₂ | 400 | 400 | 400 | — | — | — | — | — | — | — | — |
| | Z** | 2 | 6 | 6 | 6 | 6 | 6 | 6 | 5 | 5 | 4 | 4 |

*in ppm based on X
**in % by weight based on the weight of X + Y

TABLE II

| EX. | CROSSLINKING | | CELLS | | Foam density (kg/m³) | Pot life in days and in hours |
|---|---|---|---|---|---|---|
| | Time (min) | Temp. °C. | Appearance | Mean diameter (mm) | | |
| 1 | 10 | 175 | Uniform | 0,6 | 1000 | >8 days |
| 2 | 10 | 175 | Highly uniform | 0,3 | 1000 | >8 days |
| 3 | 10 | 175 | Highly uniform | 0,3 | 900 | >8 days |
| 4 | 15 | 180 | Highly uniform | 0,2 | 750 | >8 days |
| 5 | 15 | 150 | Highly uniform | 0,4 | 620 | >8 days |
| 6 | 15 | 150 | Average | 0,1 | 710 | >8 days |
| 7 | 15 | 150 | Uniform | 0,7 | 500 | >8 days |
| 8 | 10 | 175 | Uniform | 0,3 | 630 | >8 days |
| 9 | 10 | 175 | Uniform | 0,4 | 630 | >8 days |
| 10 | 10 | 175 | Nonuniform | 0,1 | 1200 | 24 hours |
| 11 | 10 | 175 | Nonuniform | 0,1 | 1200 | 24 hours |

While the invention has been described in terms of various preferred embodiments, the skilled artisan will (C) A catalytically effective quantity of a platinum catalyst;

(D) 0 to 200 parts of an inorganic and/or metallic filler; and (E) A cell forming amount of a blowing agent which comprises admixture of calcium carbonate and at least one organic carboxylic acid.

2. The composition of matter as defined by claim 1, said organic carboxylic acid comprising a linear or branched chain $C_1$–$C_{20}$ mono- or polycarboxylic acid, either saturated or containing alkenyl or alkynyl unsaturation.

3. The composition of matter as defined by claim 1, said organic carboxylic acid comprising a carbocyclic acid containing up to 25 carbon atoms.

4. The composition of matter a defined by claim 1, said organic carboxylic acid being dispersed in a silicone oil unreactive therewith.

5. The composition of matter as defined by claim 4, said unreactive silicone oil comprising an organopolysiloxane (A) having a viscosity of from 10 to 4,000 mPa.s at 25° C., or a diorganopolysiloxane having the same viscosity in which the organic radicals are selected from among methyl, ethyl, phenyl and 3,3,3-trifluoropropyl radicals, at least 70 mol % of these radicals being methyl radicals and at most 15 mol % being phenyl radicals.

6. The composition of matter as defined by claim 1, said blowing agent comprising from 1 to 70 parts of organic carboxylic acid per 100 parts of calcium carbonate.

7. The composition of matter as defined by claim 4, said blowing agent comprising a paste of the calcium carbonate in the dispersion of the organic carboxylic acid in the silicone oil.

8. The composition of matter as defined by claim 7, comprising from 0.5 to 50 parts of paste per 100 parts of composition.

9. The composition of matter as defined by claim 1, up to 50% by weight of the polymer (A) being replaced by a resinous product comprising an organopolysiloxane copolymer selected from among those including trimethylsiloxane, methylvinylsiloxane and $SiO_2$ units, in which 2.5 to 10 mol % of the silicon atoms bear a vinyl group and in which the molar ratio of the trimethylsiloxane groups to the $SiO_2$ group ranges from 0.5 to 1.

* * * * *